United States Patent
Barti et al.

(10) Patent No.: US 11,374,446 B2
(45) Date of Patent: Jun. 28, 2022

(54) POLE SHOE, ELECTRIC MOTOR, AND VEHICLE

(71) Applicant: Bayerische Motoren Werke Aktiengesellschaft, Munich (DE)

(72) Inventors: Endre Barti, Munich (DE); Dragoljub Duricic, Munich (DE); Zakaria El Khawly, Munich (DE); Daniel Loos, Munich (DE); Joerg Merwerth, Dachau (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 344 days.

(21) Appl. No.: 16/514,362

(22) Filed: Jul. 17, 2019

(65) Prior Publication Data

US 2019/0356182 A1 Nov. 21, 2019

Related U.S. Application Data

(63) Continuation of application No. PCT/EP2018/056527, filed on Mar. 15, 2018.

(30) Foreign Application Priority Data

Mar. 24, 2017 (DE) ...................... 10 2017 205 021.7

(51) Int. Cl.
| | |
|---|---|
| *H02K 1/24* | (2006.01) |
| *H02K 1/12* | (2006.01) |
| *H02K 3/47* | (2006.01) |

(52) U.S. Cl.
CPC ................ *H02K 1/24* (2013.01); *H02K 1/12* (2013.01); *H02K 3/47* (2013.01)

(58) Field of Classification Search
CPC .. H02K 1/12; H02K 3/47; H02K 1/24; H02K 29/03; H02K 2201/03; H02K 2213/03
See application file for complete search history.

(56) References Cited

U.S. PATENT DOCUMENTS 4,398,134 A * 8/1983 Muller .................. H02K 29/08
318/400.23
2001/0038253 A1 11/2001 Furuya et al.
(Continued)

FOREIGN PATENT DOCUMENTS

| CN | 1269623 A | 10/2000 |
|---|---|---|
| CN | 101689774 A | 3/2010 |

(Continued)

OTHER PUBLICATIONS

International Search Report (PCT/ISA/210) issued in PCT Application No. PCT/EP2018/056527 dated Jun. 20, 2018 with English translation (six (6) pages).

(Continued)

*Primary Examiner* — Naishadh N Desai
(74) *Attorney, Agent, or Firm* — Crowell & Moring LLP

(57) ABSTRACT

A pole shoe of an electric machine limits a winding surface of a rotor that can rotate about an axis of rotation. The pole shoe is connected to a pole web of the rotor. An outer side of the pole shoe, which faces away from the pole web in the connected state, has a first region having a substantially sinusoidal contour profile and a second region having a second contour profile. The second contour profile is different from the first contour profile and is formed in such a way that the winding surface in a circumferential direction of the rotor is lengthened with respect to a winding surface of a pole shoe having an outer side extending exclusively substantially sinusoidally.

17 Claims, 2 Drawing Sheets

(56) References Cited

U.S. PATENT DOCUMENTS

| | | | |
|---|---|---|---|
| 2010/0289370 A1 | 11/2010 | Roth et al. | |
| 2011/0248595 A1* | 10/2011 | Krotsch | H02K 1/146 310/156.46 |
| 2012/0256514 A1* | 10/2012 | Junak | H02K 1/146 310/216.092 |
| 2013/0147309 A1* | 6/2013 | Rahman | H02K 1/24 310/216.092 |
| 2016/0149445 A1* | 5/2016 | Do | H02K 1/24 310/214 |
| 2017/0077773 A1 | 3/2017 | Li et al. | |
| 2018/0123406 A1* | 5/2018 | Sturm | H02K 1/146 |

FOREIGN PATENT DOCUMENTS

| | | |
|---|---|---|
| CN | 102223041 A | 10/2011 |
| CN | 102326318 A | 1/2012 |
| CN | 102577028 A | 7/2012 |
| CN | 103427518 A | 12/2013 |
| CN | 104426255 A | 3/2015 |
| CN | 105634165 A | 6/2016 |
| CN | 106533106 A | 3/2017 |
| DE | 20 2016 107187 U1 | 3/2017 |
| EP | 1 047 177 A2 | 10/2000 |
| EP | 2 378 627 A1 | 10/2011 |
| JP | 2007-209186 A | 8/2007 |
| WO | WO 2011/038796 A1 | 4/2011 |

OTHER PUBLICATIONS

German-language Written Opinion (PCT/ISA/237) issued in PCT Application No. PCT/EP2018/056527 dated Jun. 20, 2018 (six (6) pages).

German Search Report issued in counterpart German Application No. 10 2017 205 021.7 dated Feb. 8, 2018 with partial English translation (12) pages).

Chinese-language Office Action issued in Chinese Application No. 201880005348.6 dated Apr. 23, 2021 with English translation (14 pages).

English Translation of Chinese-language Office Action issued in Chinese Application No. 201880005348.6 dated Jul. 17, 2020 (nine (9) pages).

* cited by examiner

POLE SHOE, ELECTRIC MOTOR, AND VEHICLE

CROSS REFERENCE TO RELATED APPLICATIONS

This application is a continuation of PCT International Application No. PCT/EP2018/056527, filed Mar. 15, 2018, which claims priority under 35 U.S.C. § 119 from German Patent Application No. 10 2017 205 021.7, filed Mar. 24, 2017, the entire disclosures of which are herein expressly incorporated by reference.

BACKGROUND AND SUMMARY OF THE INVENTION

The invention relates to a pole shoe for bounding a winding surface of a rotor that can rotate about an axis of rotation, especially for an electric machine. The invention also relates to an electric machine having such a pole shoe, and to a vehicle with such an electric machine.

Electric machines in so-called generator duty can generate electrical energy from kinetic energy, such as the rotation of an axle. In vehicles with internal combustion engines, the electric machines, also known as "alternators," serve for example to generate or provide electrical energy for the onboard network of the vehicle.

On the other hand, electric machines may also be used to generate kinetic energy, such as an axle rotation, from electrical energy. In view of limited resources and environmental friendliness, for example electrically driven vehicles are being developed whose centerpiece is electric machines which replace the classical combustion engine. The requirements placed on electric machines used in such a manner involve, for example, an efficient utilization of stored electrical energy and a high and constant power output, in order to be able to compete with or even to surpass the classical combustion engines.

One problem which the invention proposes to solve is to provide an improved pole shoe. In particular, it proposes to minimize scatter losses of the magnetic flux in an electric machine, especially upon emerging from a pole shoe, with an enlarged winding surface.

This problem is solved by a pole shoe, an electric machine with such a pole shoe, and a vehicle with such an electric machine as claimed in the independent claims. Advantageous embodiments are proposed in the dependent claims.

A first aspect of the invention relates to a pole shoe for bounding a winding surface of a rotor that can rotate about an axis of rotation, especially of an electric machine, wherein the pole shoe is or can be connected to a pole web of the rotor. An outer side of the pole shoe facing away from the pole web in the connected condition has a first region with a substantially sinusoidal contour profile and a second region with a second contour profile. The second contour profile is different from the first contour profile and is formed in such a way that the winding surface in a circumferential direction of the rotor is lengthened with respect to a winding surface of a pole shoe with an outer surface extending exclusively substantially sinusoidally.

A second aspect of the invention relates to an electric machine, especially an electrically excited synchronous machine, having a stator and a rotor. The rotor comprises a pole shoe according to the first aspect of the invention.

A third aspect of the invention relates to a vehicle, especially a motor vehicle, with an electric machine according to the second aspect of the invention.

The features and benefits described in the following with respect to the first aspect of the invention and its advantageous embodiment also hold, where technically feasible, for the second and third aspect of the invention and its advantageous embodiment, and vice versa.

A sinusoidal contour profile or a profile with a sine shape means, in the sense of the invention, a profile, especially that of a component and/or a gap, according to a mathematical function $f(x)=1/\sin(x)$. For example, if a gap, such as an air gap, is bounded by two components, such as a pole shoe and a stator of an electric machine, and if one of these components, such as the pole shoe, is formed with such a sinusoidal contour profile, the gap will have a minimal spacing at a given position, especially at an axis of symmetry of the pole shoe, and this spacing will increase along the gap.

A winding surface in the sense of the invention means a region at or around a pole web of a rotor of an electric machine that is bounded radially on the inside preferably by a rotor axle of the rotor and radially on the outside preferably by a pole shoe. The winding surface is designed or configured in particular to accommodate the winding turns of a coil wire or a coil.

The direction or position indications "radial", "axial" and "circumferential direction" in the sense of the invention relate to an axis of rotation of a rotor, especially that of an electric machine.

The invention is based in particular on the notion of configuring an outer side of a pole shoe for a rotor in such a way that a winding surface bounded by the pole shoe, especially by an inner side of the pole shoe situated opposite the outer side, is or becomes enlarged and at the same time the outer side is or becomes electromagnetically optimized in configuration. For this, a first contour in a first region of the outer side, especially a central region in the circumferential direction, is configured or formed sinusoidally. Furthermore, a second region of the outer side, especially an outer region in the circumferential direction, adjoins the first region by a second contour, while a profile of the second contour is different from the electromagnetically optimized sine shape and is designed to lengthen the inner side in the circumferential direction, this being accompanied by an enlarging or lengthening of the winding surface.

As compared to a winding surface which is bounded by a pole shoe with an exclusively sinusoidal contour, additional winding turns of a coil, which are wound in the region of the winding surface, can be arranged through the pole shoe of the invention. In this way, for the same energy expenditure, an increased magnetic flux can be generated, which boosts the performance of an electric machine with such a pole shoe.

In particular, thanks to the lengthening of the inner side or the winding surface, a gap between the pole shoe and a further pole shoe, especially a neighboring one arranged on the rotor, can be decreased. Thus, additional surface or volume can be filled or occupied between two neighboring pole shoes with additional winding turns of coil wire or coils wound around the pole webs.

Owing to the sinusoidal contour profile in the first region of the outer side, at the same time the scatter losses of the magnetic flux generated by the windings of the coil arranged in the region of the winding surface and emerging through the outer side of the pole shoe can be minimized as compared to contour profiles of other shapes. Likewise, in this way a uniform coupling of the magnetic flux to poles of a stator surrounding the rotor can be achieved in the electric machine with such pole shoes and thus fluctuations in the generated torque can be reduced. In addition, the sinusoidal contour profile has also proven to be beneficial in regard to the noise produced during the operation of such an electric machine.

On the whole, the invention makes it possible to generate a high magnetic flux, while at the same time minimizing scatter losses of this flux upon emerging from the pole shoe.

In one preferred embodiment, the pole shoe is or can be connected to a radially outer end of the pole web. The winding surface here is preferably bounded by an inner side situated opposite the outer side, i.e., facing toward the pole web. The pole shoe is preferably designed to brace the winding turns of a coil, which are arranged in the region of the winding surface, against forces of acceleration acting during the rotation of the rotor. Furthermore, the pole shoe is designed in particular to conduct the magnetic flux generated by the coil especially into or through the air gap between the pole shoe and the stator of the electric machine. In order to improve the conductance for the magnetic flux, the pole shoe and the pole web are preferably joined together by integral bonding, especially formed as a single piece.

In another preferred embodiment, the pole shoe tapers along the circumferential direction. In particular, the second contour profile is configured such that the pole shoe tapers toward the end of the pole shoe, especially in the second region of the outer surface. In this way, on the one hand, the pole shoe is electromagnetically optimized in configuration or shape in the first region, and on the other hand additional winding surface is made available on an inner side of the pole shoe situated opposite the outer side, so that a large number of windings of the coil can be arranged in the region of the winding surface. In addition, a tapering pole shoe enables a favorable aerodynamic shape of the pole shoe, so that air friction losses can be diminished during operation of the electric machine with such a pole shoe.

In another preferred embodiment, an overall contour profile of the outer side of the pole shoe, especially at the transition from the first region to the second region, is configured to be substantially continuously differentiable. In other words, the first contour profile in the first region merges substantially tangentially into the second contour profile in the second region. In this way, the pole shoe can be broader and longer in the second region along the circumferential direction, without additional scatter loss occurring for the magnetic flux carried by the pole shoe at the transition from the first contour profile to the second contour profile. In particular, the magnetic flux can emerge substantially homogeneously across the entire outer side of the pole shoe. In addition, air vortices can be suppressed or at least reduced in the operation of the electric machine with such a pole shoe, so that a high efficiency of such an electric machine is made possible.

In another preferred embodiment, the second region has a substantially rectilinear second contour profile. Preferably, the rectilinear second contour profile is tilted with respect to an axis of symmetry or plane of symmetry of the pole web by a given angle, preferably between 15° and 80°, especially preferably between 25° and 75°, in particular between 50° and 75°. In this way, the width of the pole shoe in the second region can be easily adapted along the circumferential direction, in particular, to a given spacing between the pole shoe and a further, neighboring pole shoe.

In another preferred embodiment, the second contour profile has at least one curvature, especially a concave one. In this way, the pole shoe can be broadened or lengthened in the second region along the circumferential direction substantially up to a further, neighboring pole shoe or at least into a region in front of the further, neighboring pole shoe, without at the same time falling short of a given minimum value for the radial thickness or strength of the pole shoe. This enables an adequate mechanical stability of the pole shoe, especially in regard to acceleration forces acting on the pole shoe, such as are generated or are acting during rotation of the rotor, i.e., during operation of the electric machine.

In another preferred embodiment, the first region extends across at least ⅔, especially ¾, ⅘, ⅚ or 6/7 of a width of the outer side along the circumferential direction. In this way, the greater portion of the outer side of the pole shoe can be configured with the first, sinusoidal contour profile and it therefore has an electromagnetically favorable shape, i.e., one which minimizes the scatter losses of the magnetic flux.

In another preferred embodiment, the outer side at one end of the pole shoe which is facing toward a further pole shoe neighboring the pole shoe has a third region with a third contour profile, especially with a convex curvature. Preferably, the third contour profile tangentially adjoins the second contour profile. In particular, a derivative of the second contour profile and the third contour profile at the transition between the two contour profiles is substantially continuous. In this way, the magnetic flux can be conducted in the pole shoe with no additional scatter losses occurring in the magnetic flux conducted by the pole shoe at a transition from the second contour profile to the third contour profile. Furthermore, the rounded, preferably convex-shaped end of the pole shoe provides favorable aerodynamic qualities of the pole shoe, so that air friction losses and noise output during the rotation of the rotor in operation of the electric machine can be reduced.

In another preferred embodiment, the outer side is connected to an inner side of the pole shoe, facing toward the pole web, by the third contour profile. In this way, the winding surface can be maximized in the third region, also with electromagnetically and/or aerodynamically favorable shaping of the outer side of the pole shoe or the end of the pole shoe.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1A:
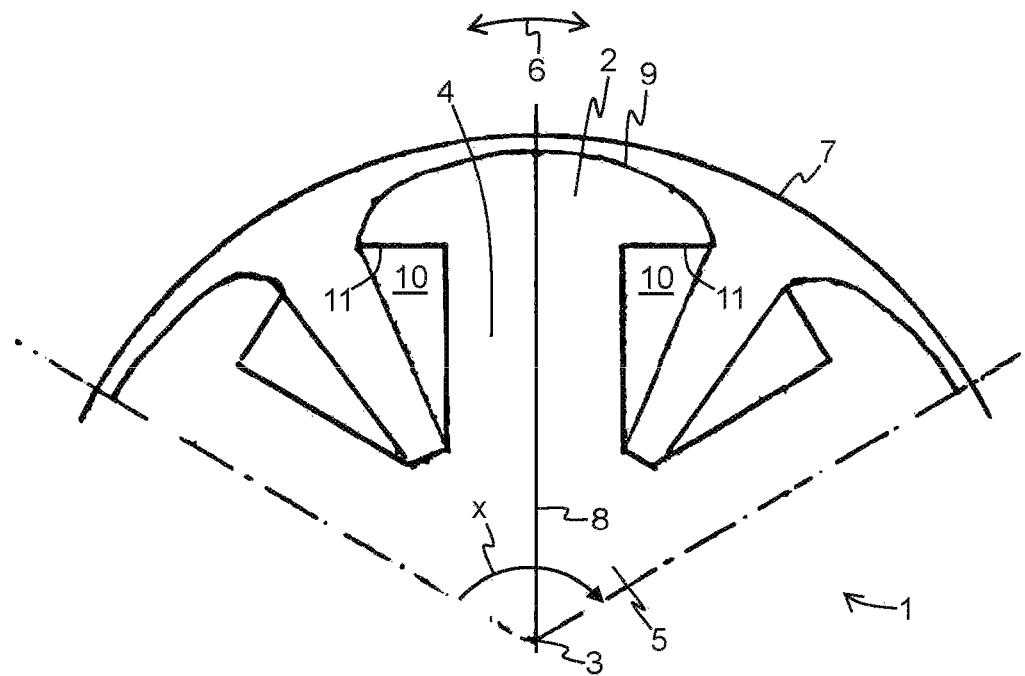
FIGS. 1A and 1B are cut-out views of rotors for an electric machine with pole shoes according to the prior art, in a cross section.

FIG. 1 shows two examples of a rotor 1 with pole shoes 2, such as are known from the prior art, represented in a cross section running perpendicular to an axis of rotation 3 of the rotor. The rotors 1 are shown only in an angle region of x=120°. The pole shoes 2 are joined to pole webs 4, which in turn are arranged on a rotor axle 5 of the rotor 1 at regular intervals along a circumferential direction 6. The rotor 1 is bounded radially on the outside by a stator 7 drawn schematically as a line.

Each of the pole webs 4 and pole shoes 2 is formed or configured symmetrically with respect to an axis of symmetry 8 or in three dimensions with respect to a plane of symmetry extending parallel to the indicated axis of symmetry 8 and perpendicular to the plane of the drawing.

FIG. 1A shows so-called "sine poles". The contour of an outer surface 9 of the pole shoes 2 runs sinusoidally, i.e., according to the function $f(x)=1/\sin(x)$. Since the stator 7 has a constant curvature, the thickness of an air gap between the pole shoe 2 and the stator 7 varies in the radial direction by the function $d(x)=d_0 \, 1/\sin(x)$, where $d_0$ is the thickness of the air gap or the spacing between the pole shoe 2 and stator 7 in the region of the axis of symmetry 8. In the circumferential direction 6, the thickness of the air gap further increases constantly across the pole shoes 2 to their ends facing neighboring pole shoes.

A pole shoe 2 of such a configuration is especially favorable electromagnetically. In particular, scatter losses of a magnetic flux running through the pole shoe 2 at the emergence of the magnetic flux through the outer side 9 and the noise production during rotation of the rotor 1 and torque fluctuations in the coupling of the magnetic flux to poles, not shown, of the stator 7 are minimized.

Figure 1B:
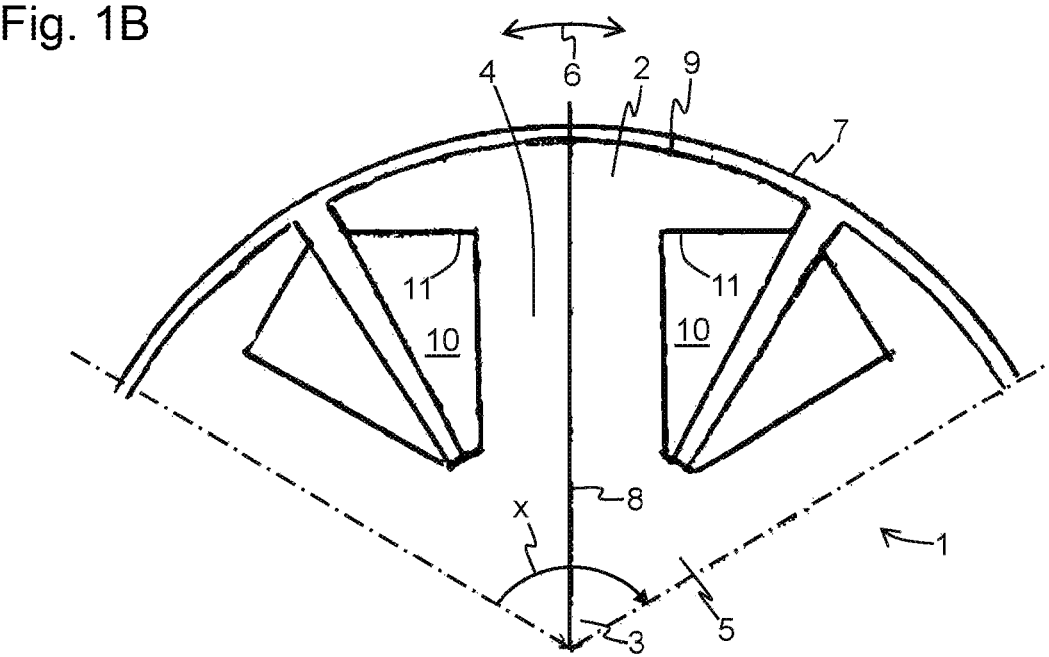

FIG. 1B shows so called "rectangular poles". Here, the contour of the outer surface 9 of the pole shoes 2 runs substantially parallel to the stator 7. In other words, the air gap between the pole shoes 2 and the stator 7, especially the poles of the stator 7 which are not shown, remains substantially constant as a result.

However, on account of the shape, which is elongated in the circumferential direction, of the rectangular pole there is a larger winding surface 10 as compared to the sine pole. The winding surfaces 10 are bounded radially on the inside by the rotor axle 5 and radially on the outside by the pole shoes 2, especially by an inner side 11 of the pole shoes 2 which lies opposite the outer side 9. Thanks to the outer side 9 of the pole shoes 2 which has constant curvature, an extension of the inner side 11, and thus the winding surface 10, into a region in front of a further pole shoe adjacent to the respective pole shoe 2 is achieved. In other words, thanks to such a formation of the pole shoes 2, the gap between two adjacent pole shoes can be minimized, so that room can be gained for additional winding surface.

Winding turns of coils (not shown) are arranged in the region of the winding surfaces 10, generating a magnetic flux in the interior of the pole webs 4 when current flows through them. Due to the additional winding surface, additional winding turns can be wound around the pole webs 4, so that the magnetic flux which is generated can be increased. However, the scatter losses of the magnetic flux upon emerging from the substantially constantly curved outer side 9 of the pole shoe 2 are higher as compared to the scatter losses upon emerging from a sinusoidally curved outer side.

Figure 2:
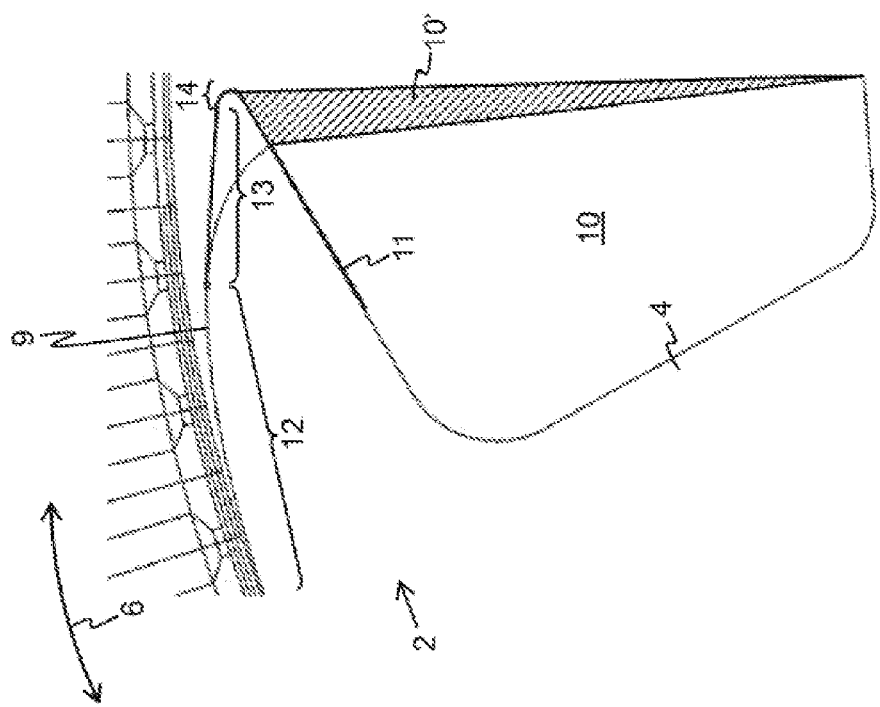
FIG. 2 is a portion of a pole shoe in a first preferred embodiment of the invention in a cross section.

FIG. 2 shows a preferred embodiment of a pole shoe 2 connected to a pole web 4. The pole shoe 2 has on an outer side 9 a first contour profile in a first region 12 and a second contour profile in a second region 13. In a third region 14, a third contour profile is formed in such a way that the outer side 9 merges into an inner side 11 of the pole shoe 2 situated opposite the outer side 9.

The first contour profile here corresponds to a substantially sinusoidal contour profile. In other words, the outer side 9 of the pole shoe 2 runs in the first region 12, which extends preferably over around ¾ of the outer side 9, substantially according to a function $f(x)=1/\sin(x)$.

The second contour profile corresponds to a substantially linear contour profile. In other words, the first contour profile is continued as a substantially straight line from the first region 12 in the second region 13, until it joins the outer side 9 to the inner side 11 in the third region 14. The first contour profile merges tangentially into the second contour profile. In other words, the overall contour profile of the outer side 9 is continuously differentiable along a circumferential direction 6, especially also at the transition point from the first to the second region or from the first contour profile to the second contour profile.

The inner side 11, like the outer side 9, is broadened or lengthened with respect to the inner side of a pole shoe designed as a sine pole in the circumferential direction 6 and it extends in particular into a region immediately in front of a further pole shoe (not shown) adjacent to the pole shoe 2.

In this way, the winding surface 10 of the pole shoe 2 so configured can be enlarged with respect to a pole shoe designed as a sine pole by an additional winding surface 10', indicated by the hatched region, so that additional winding turns of a coil (not shown) can be arranged in a region of the additional winding surface 10'. In this way, the magnetic flux generated by the coil can be increased in the pole web 4 and in the pole shoe 2, while at the same time the scatter losses of the magnetic flux, especially upon emerging from the pole shoe 2 through the outer side 9, especially in the first region 12, can be decreased.

Figure 3:
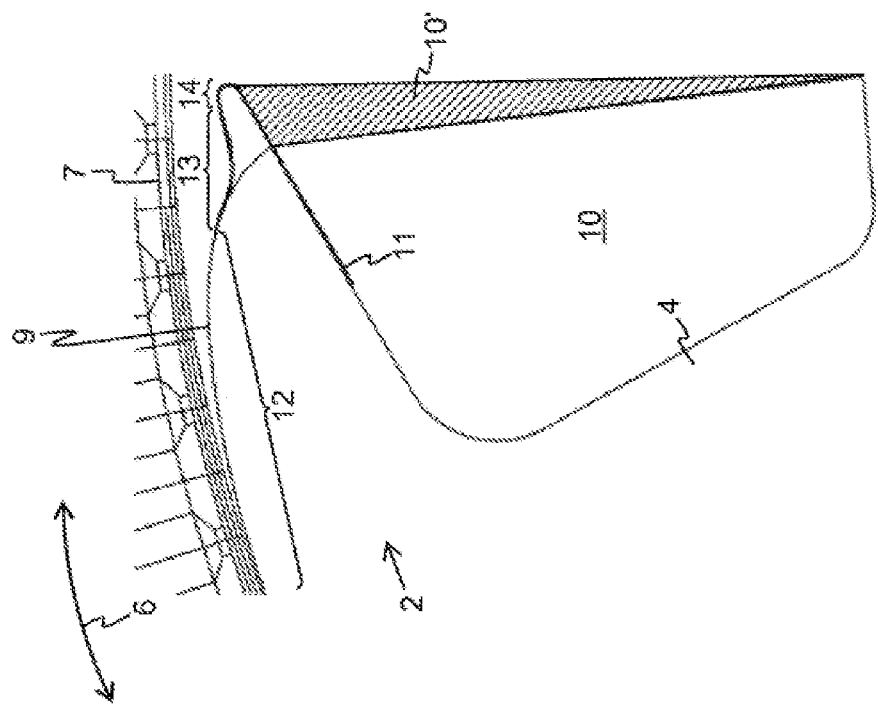
FIG. 3 is a portion of a pole shoe in a second preferred embodiment of the invention in a cross section.

FIG. 3 shows another preferred embodiment of a pole shoe 2 connected to a pole web 4. Here, a first region 12 of an outer side 9 of the pole shoe 2 extends preferably over substantially ⅘ of the outer side 9. A first sinusoidal contour profile in the first region 12 merges into a second contour profile of a second region 13. In a third region 14, the outer side 9 is connected by a third contour profile to an inner side 11 of the pole shoe 2.

Analogously to the embodiment shown in FIG. 2, the first and second contour profile merge tangentially into one another or tangentially adjoin each other, i.e., an overall contour profile of the outer side 9 is continuously differentiable in a circumferential direction 6.

The second contour profile in the second region 13 has a concave curvature, which lies opposite a convex curvature of the sinusoidal contour profile in the first region 12. The second contour profile or the concave curvature of the second contour profile is configured in particular in such a way that an air gap between the pole shoe 2 and a stator 7, especially a pole (not represented) of the stator 7, is or remains substantially constant in the second region 13. Alternatively, the second contour profile or the concave curvature of the second contour profile can also be configured in such a way that the air gap in the circumferential direction becomes smaller or the thickness of the air gap decreases toward an end of the pole shoe 2 facing a neighboring further pole shoe (not represented).

Here as well, the inner side 11, like the outer side 9, of the pole shoe 2 is lengthened in the circumferential direction 6 with respect to the inner side of a pole shoe designed as a sine pole and it extends in particular into a region immediately in front of a further pole shoe (not represented) neighboring the pole shoe 2.

In this way, a winding surface 10 can be widened, as compared to a winding surface of a pole shoe designed as a sine pole, by an additional winding surface 10'. In a region, shown hatched, of the additional winding surface 10' it is possible to arrange additional winding turns of a coil (not represented), which generate an additional magnetic flux in the pole web 4 and the pole shoe 2 when electric current flows through them. The overall magnetic flux can emerge through the outer side 9 of the pole shoe 2, especially in the first region 12, without additional scatter losses occurring on account of a detrimental configuration of the outer side 9 of the pole shoe 2.

LIST OF REFERENCE SYMBOLS

1 rotor
2 pole shoe
3 axis of rotation
4 pole web
5 rotor axle
6 circumferential direction
7 stator
8 axis of symmetry
9 outer side
10 winding surface
10' additional winding surface
11 inner side
12 first region
13 second region
14 third region
x angle region The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A pole shoe for bounding a winding surface of a rotor that is rotatable about an axis of rotation, wherein the pole shoe is connectable to a pole web of the rotor, comprising:
    an outer side of the pole shoe facing away from the pole web in a connected condition, wherein
    the outer side has a first region with a substantially sinusoidal contour profile, and
    the outer side has a second region with a second contour profile, which is different from the first contour profile and is formed such that the winding surface in a circumferential direction is lengthened with respect to a winding surface of a pole shoe with an outer surface extending exclusively substantially sinusoidally.

2. The pole shoe according to claim 1, wherein the pole shoe is connectable to a radially outer end of the pole web.

3. The pole shoe according to claim 1, wherein the pole shoe tapers along the circumferential direction.

4. The pole shoe according to claim 1, wherein an overall contour profile of the outer side of the pole shoe is configured to be substantially continuously differentiable.

5. The pole shoe according to claim 1, wherein the overall contour profile of the outer side of the pole shoe at a transition from the first region to the second region is configured to be substantially continuously differentiable.

6. The pole shoe according to claim 1, wherein the second region has a substantially rectilinear second contour profile.

7. The pole shoe according to claim 1, wherein the second contour profile has at least one curvature.

8. The pole shoe according to claim 7, wherein the second contour profile is a concave curvature.

9. The pole shoe according to claim 1, wherein the first region extends across at least ⅔ of a width of the outer side along the circumferential direction.

10. The pole shoe according to claim 1, wherein the first region extends across one of ¾, ⅘, ⅚ or 6/7 of a width of the outer side along the circumferential direction.

11. The pole shoe according to claim 1, wherein the outer side at one end of the pole shoe which is facing toward a further pole shoe neighboring the pole shoe has a third region with a third contour profile.

12. The pole shoe according to claim 11, wherein the third contour profile has a convex curvature.

13. The pole shoe according to claim 11, wherein the outer side is connected to an inner side of the pole shoe, facing toward the pole web, by the third contour profile.

14. The pole shoe according to claim 1, wherein the pole shoe is a pole shoe of an electric machine.

15. An electric machine, comprising:
    a stator; and
    a rotor,
    wherein the rotor comprises a pole shoe according to claim 1.

16. The electric machine according to claim 15, wherein the electric machine is an electrically excited synchronous machine.

17. A vehicle, comprising an electric machine according to claim 15.

* * * * *